(12) United States Patent
Kimura

(10) Patent No.: US 10,275,694 B2
(45) Date of Patent: Apr. 30, 2019

(54) IMAGE FORMING APPARATUS AND IMAGE FORMING SYSTEM HAVING BINDING UNIT CAPABLE OF PERFORMING BINDING, AND CONTROL METHOD FOR THE BINDING UNIT

(71) Applicant: CANON KABUSHIKI KAISHA, Tokyo (JP)

(72) Inventor: Hiromi Kimura, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 113 days.

(21) Appl. No.: 15/246,218

(22) Filed: Aug. 24, 2016

(65) Prior Publication Data

US 2017/0061261 A1 Mar. 2, 2017

(30) Foreign Application Priority Data

Aug. 27, 2015 (WO) ............... PCT/JP2015/074145

(51) Int. Cl.
| | |
|---|---|
| G06K 15/02 | (2006.01) |
| G06K 15/00 | (2006.01) |
| G03G 15/00 | (2006.01) |
| B42B 4/00 | (2006.01) |
| B42C 1/12 | (2006.01) |

(52) U.S. Cl.
CPC ............ *G06K 15/1809* (2013.01); *B42B 4/00* (2013.01); *B42C 1/12* (2013.01); *G03G 15/6544* (2013.01); *G06K 15/404* (2013.01)

(58) Field of Classification Search
CPC ................................................ G06K 15/1809

USPC ......................................................... 399/408
See application file for complete search history.

(56) References Cited

U.S. PATENT DOCUMENTS

| | | | | |
|---|---|---|---|---|
| 6,213,456 | B1 * | 4/2001 | Hirano | G03G 15/6541 |
| | | | | 270/58.07 |
| 7,424,237 | B2 * | 9/2008 | Ushio | G03G 15/36 |
| | | | | 399/408 |
| 8,156,509 | B2 * | 4/2012 | Lacombe | G06F 9/541 |
| | | | | 719/331 |
| 8,331,847 | B2 * | 12/2012 | Matsushita | B26F 1/0092 |
| | | | | 399/407 |
| 2005/0116461 | A1 * | 6/2005 | Katz | B42C 9/00 |
| | | | | 281/21.1 |

(Continued)

FOREIGN PATENT DOCUMENTS

| | | |
|---|---|---|
| JP | 2004-167700 A | 6/2004 |
| JP | 2010-146353 A | 7/2010 |

(Continued)

*Primary Examiner* — Anthony H Nguyen
(74) *Attorney, Agent, or Firm* — Canon U.S.A., Inc. IP Division

(57) ABSTRACT

Print data in a predetermined format including information for specifying the type of binding and print data in a predetermined format excluding the information for specifying the type of binding are adequately handled, wherein on the basis of reception of print data in a predetermined format including information for specifying the type of binding, control is exerted in such a manner that binding of the specified type is performed on printed matter, and on the basis of reception of print data in a predetermined format excluding the information for specified the type of binding, control is exerted in such a manner that binding of a predetermined type is performed on printed matter.

23 Claims, 7 Drawing Sheets

(56) References Cited

U.S. PATENT DOCUMENTS

| | | | | |
|---|---|---|---|---|
| 2005/0152725 A1* | 7/2005 | Mochizuki | ............... | B26F 1/04 |
| | | | | 399/410 |
| 2007/0201071 A1* | 8/2007 | Yamada | ............... | G06F 3/1205 |
| | | | | 358/1.13 |
| 2008/0252062 A1* | 10/2008 | Kelley | ................... | B65H 45/30 |
| | | | | 281/21.1 |
| 2009/0035093 A1* | 2/2009 | Takagi | ............... | G03G 15/6544 |
| | | | | 412/11 |

FOREIGN PATENT DOCUMENTS

| JP | 2015-016618 A | 1/2015 |
|---|---|---|
| WO | 2006-347115 A1 | 12/2006 |

\* cited by examiner

FIG. 4A  <</Staple 3 /StapleDetails <</Type 21 /Position (TopLeft) /EcoStaple true >> >> setpagedevice
         401                         402                403                    404

FIG. 4B  <</Staple 0 >> setpagedevice
         405

FIG. 4C  <</Staple 3 /StapleDetails <</Type 21 /Position (TopLeft) >> >> setpagedevice FIG. 4D  <</Staple 3 /StapleDetails <</Type 21 /EcoStaple true >> >> setpagedevice FIG. 4E  <</Staple 3 >> setpagedevice FIG. 4F  <</EcoStaple 3 /StapleDetails <</Type21 /Position (TopLeft) >> >> setpagedevice
         406

IMAGE FORMING APPARATUS AND IMAGE FORMING SYSTEM HAVING BINDING UNIT CAPABLE OF PERFORMING BINDING, AND CONTROL METHOD FOR THE BINDING UNIT

TECHNICAL FIELD

The present disclosure relates to a binding process in which sheets are bound.

BACKGROUND ART

Some image forming apparatuses perform a process (stapling process) of binding multiple sheets by using a staple. In known techniques, when an image forming apparatus that is capable of performing a stapling process is instructed to perform a stapling process, a user system such as a host PC inputs, to the image forming apparatus, print data that is described in a predetermined format and that includes information indicating an instruction to perform binding.

In contrast, in addition to the stapling process described above, a binding operation without a staple is used. In PTL 1, an image forming apparatus is disclosed which is capable of performing both of the stapling process and a binding process (binding-by-pressure process) performed by pressuring multiple sheets. The image forming apparatus receives, from a user system, print data that is described in a predetermined format and that includes information for specifying the type of binding, and performs binding in accordance with the information that is used to specify the type of binding and that is included in the print data. When the print data includes information for specifying the stapling process, the stapling process is performed. When the print data includes information for specifying the binding-by-pressure process, the binding-by-pressure process is performed.

CITATION LIST

Patent Literature

PTL 1 Japanese Patent Laid-Open No. 2004-167700

As described above, a method in which the type of binding is specified and which is used when an instruction to perform binding is provided depends on a user system. That is, a certain user system has a configuration in which print data in a first format including information for specifying the type of binding is output. Another user system has a configuration in which print data in a second format excluding information for specifying the type of binding is output. Therefore, an object of the present disclosure is to adequately handle print data in the two formats which indicates an instruction to perform binding.

SUMMARY

A method in which a binding process is controlled and which is provided by the present disclosure includes receiving print data including a binding command; determining whether the binding command is in a first predetermined format where a bind type is needed to be specified or in a second predetermined format where a bind type is not needed to be specified; based on the binding command determined to be in the first predetermined format, binding, by one of binding methods which corresponds to the specified bind type, prints which are based on the received print data; and based on the binding command determined to be in the second predetermined format without a bind type, binding, by a predetermined binding method, prints which are based on the received print data.

Further features of the present disclosure will become apparent from the following description of exemplary embodiments with reference to the attached drawings.

BRIEF DESCRIPTION OF DRAWINGS

FIGS. 4A to 4F are diagrams for describing exemplary operators that describe about binding and that are included in print data, each in accordance with an embodiment of the subject disclosure.

DESCRIPTION OF EMBODIMENTS

Embodiments of the present disclosure will be described below with reference to the drawings.

First Embodiment

Hardware Configuration of Image Forming Apparatus

Figure 1:
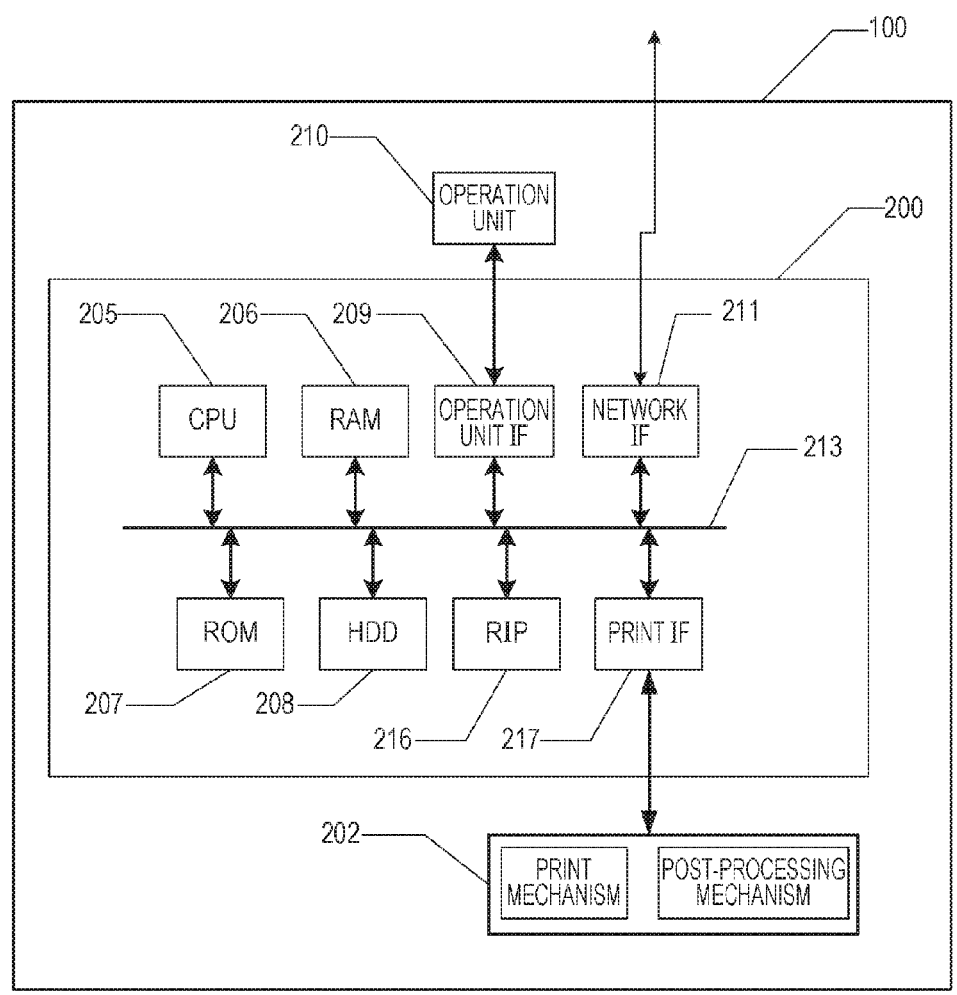
FIG. 1 is a block diagram illustrating an exemplary hardware configuration of an image forming apparatus, in accordance with an embodiment of the subject disclosure.

FIG. 1 is a block diagram illustrating the hardware configuration of an image forming apparatus 100 according to the present embodiment. The image forming apparatus 100 includes a controller 200, an operation unit 210, and a print apparatus 202.

The operation unit 210 which is a touch screen is a user interface in which a screen is displayed and through which user operations are received on the screen. The operation unit 210 receives, from the controller 200, a screen that is to be displayed, and transmits, to the controller 200, information that is input through a user operation. The operation unit 210 displays a setting screen (see FIGS. 2A to 2C) for binding, and transmits, to the controller 200, setting information that is input through a user operation on the screen.

Figure 3:
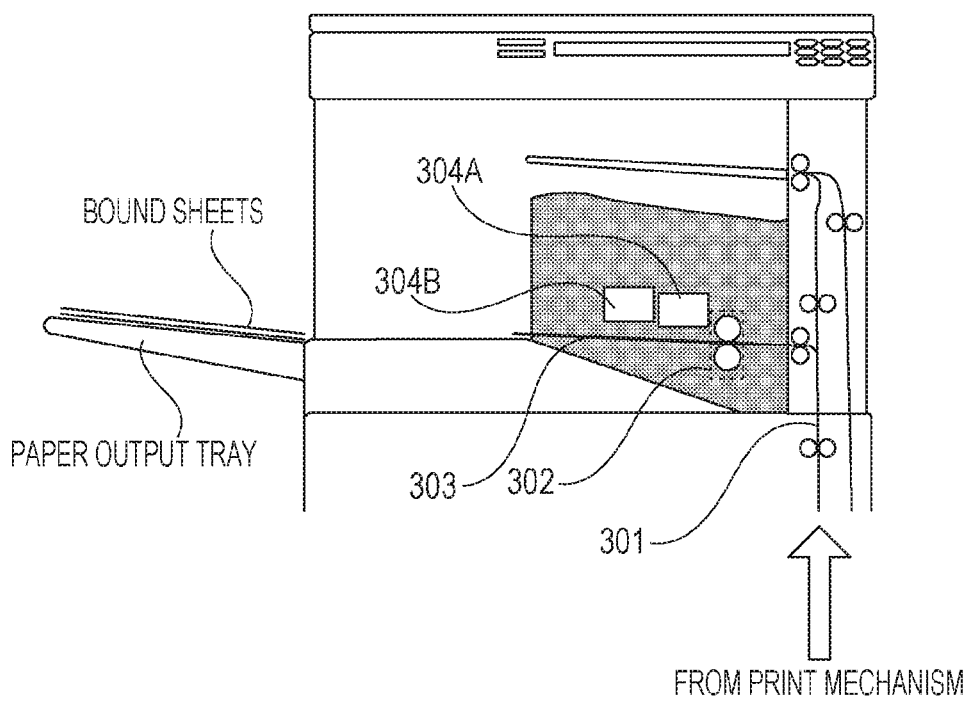
FIG. 3 is a diagram illustrating an exemplary configuration of a post-processing mechanism, in accordance with an embodiment of the subject disclosure.

The print apparatus 202 includes a CPU (not illustrated) having at least one or more processors, a print mechanism, and a post-processing mechanism (see FIG. 3). The CPU controls the print mechanism and the post-processing mechanism on the basis of information transmitted from the controller 200.

The print mechanism according to the present embodiment which includes a print engine using an electrophotographic system prints an image on a sheet by using the electrophotographic system on the basis of image data received from the controller 200. Specifically, the print engine causes a laser to emit light onto a photoreceptor in accordance with the image data (video data) received from the controller 200, so as to form a latent image. The print engine then develops the latent image by using a developer (toner), and transfers/fixes, onto a sheet, the toner image (image) obtained through development. In addition, the print mechanism includes a mechanism (conveying rollers) for conveying the printed sheet to the post-processing mechanism. An inkjet system, a thermal system, or another print system may be used for the print engine.

As illustrated in FIG. 3, the post-processing mechanism includes a sheet conveying path 301 using the conveying rollers, and holding rollers 302 for temporarily holding one or more sheets in order to perform binding on conveyed sheets. In addition, the post-processing mechanism includes binding mechanisms 304A and 304B for performing binding one or more sheets 303 held by the holding rollers 302.

The binding mechanism 304A is a stapling mechanism for performing, on the sheets that are held, a process (stapling process: first binding process) of binding multiple sheets with a staple. The binding mechanism 304B is a stapling mechanism for performing, on the sheets that are held, a process (binding-by-pressure process: second binding process) of binding multiple sheets by processing the sheets through pressing of the sheets themselves. That is, the post-processing mechanism is also a binding mechanism that is capable of selectively executing two types of binding processes.

The sheets having been subjected to binding by the binding mechanism 304A or 304B are released from the holding rollers 302, are conveyed by using conveying rollers (not illustrated), and are discharged to a paper output tray. Thus, sheets (bound article) having been subjected to binding are obtained.

The controller 200 includes a CPU 205 including at least one or more processors, a RAM 206 that is a volatile memory, a ROM 207 that is a nonvolatile memory, and an HDD 208. The controller 200 also includes an operation unit IF (interface) 209, a network IF 211, an RIP (raster image processor) 216, and a print IF 217. The units are connected to a bus 213, and are capable of communicating with one another via the bus 213.

The operation unit IF 209 is an interface for communicating with the operation unit 210. The network IF 211 which is an interface for receiving data such as PDL data from an external apparatus is a network interface card or the like. The RIP 216 generates a bitmap image based on the received PDL data. The print IF 217 is an interface for transmitting information about binding and image data, from the controller 200 to the print apparatus 202. The CPU 205 executes programs stored in the ROM 207, and controls operations of the units according to the programs which are being executed, whereby the processes for flowcharts described below are performed.

Setting Screen for Binding

Figure 2A:
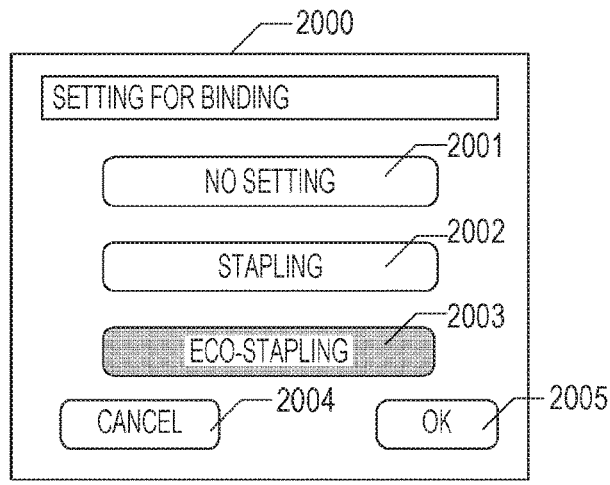
FIGS. 2A to 2C are diagrams illustrating setting screens for a sheet binding process, each in accordance with an embodiment of the subject disclosure.
Figure 2B:
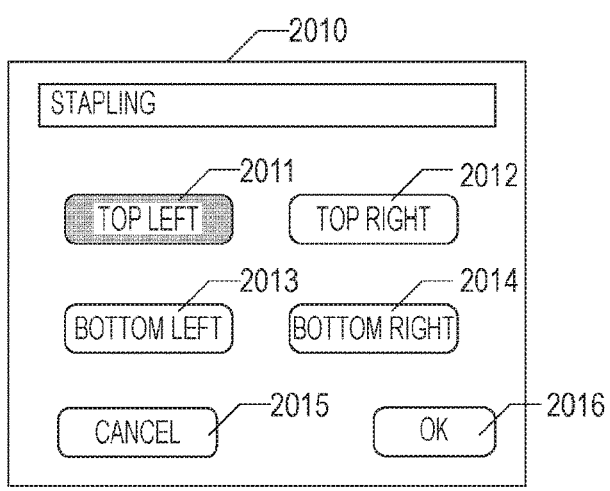
Figure 2C:
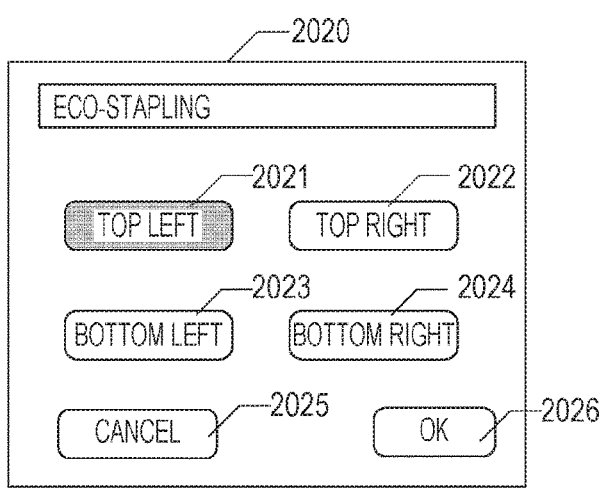

The CPU 205 executes control programs stored in the ROM 207, thereby generating screens illustrated in FIGS. 2A to 2C and displaying the generated screens on the operation unit 210 via the operation unit IF 209. In addition, information corresponding to a user operation received through the operation unit 210 (for example, information about which button has been pressed) is obtained through the operation unit 209 IF, and the information is notified to the CPU 205. The CPU 205 performs a process according to the notified information. Thus, settings for binding are made. Each of the settings for binding is registered in the RAM 206. For example, as settings for binding which are made in the image forming apparatus 100, information indicating whether or not binding is to be performed and information indicating a binding position in the case where binding is to be performed are registered in the RAM 206. Thus, as described below, each piece of setting information (user-specified setting information) registered on the basis of a user instruction is referred to and used by the CPU 205, for example, when PDL data does not include information for specifying a binding process, or when some operators about binding which are to be included in the PDL data are missing as described below.

FIG. 2A illustrates a screen which is generated by the CPU 205 on the basis of a user operation performed through the operation unit 210, and is displayed by the operation unit 210. A screen 2000 is a screen for causing a user to select, as a setting of the image forming apparatus 100, one of a setting for performing the stapling process on printed sheets, a setting for performing the binding-by-pressure process on the printed sheets, and a setting for performing neither of the binding processes on the printed sheets. A button 2001 is a button for selecting a setting for performing neither of the binding processes on the printed sheets. A button 2002 is a button for selecting a setting for performing the stapling process on the printed sheets. A button 2003 is a button for selecting a setting for performing the binding-by-pressure process on the printed sheets. A binding-by-pressure process is called eco-stapling in FIGS. 2A and 2C.

The CPU 205 highlights a button among the buttons 2001, 2002, and 2003 which has been pressed by a user. The CPU 205 stores information indicating which button is being currently highlighted in the RAM 206. In this state, when a user presses an OK button 2005, the CPU 205 refers to the information stored in the RAM 206, and registers a setting corresponding to the highlighted button as a setting of the image forming apparatus 100 in the RAM 206. For example, in the state in which the button 2003 is being highlighted as illustrated in FIGS. 2A to 2C, when a user presses the OK button 2005, the CPU 205 registers a setting for performing the binding-by-pressure process as a setting of the image forming apparatus 100 in the RAM 206. In contrast, when a cancel button 2004 is pressed, the CPU 205 does not change each setting for binding which is registered in the RAM 206, and ends the setting operation for binding.

In the state illustrated in FIG. 2A, when a user presses the button 2002, the CPU 205 changes the screen displayed on the operation unit 210 to a screen 2010 illustrated in FIG. 2B. In the state illustrated in FIG. 2A, when a user presses the button 2003, the CPU 205 changes the screen displayed on the operation unit 210 to a screen 2020 illustrated in FIG. 2C.

The screen 2010 illustrated in FIG. 2B is a screen for specifying a binding position of a staple which is used when a stapling process is performed. Buttons 2011, 2012, 2013, and 2014 are buttons for specifying one of the four corners (top left, top right, bottom left, and bottom right) of a sheet, as a binding position of a staple. That is, in the present embodiment, a binding position available for the stapling process is one of top left, top right, bottom left, and bottom right.

The CPU 205 determines a button which has been pressed by a user, highlights the button, and stores, in the RAM 206, information about a binding position corresponding to the highlighted button. For example, when a user presses the button 2011, the CPU 205 stores, in the RAM 206, information indicating that the binding position of a staple is top left. After that, when the user presses the button 2014, the CPU 205 updates information that describes a binding position of a staple and that is already stored in the RAM 206, with information indicating that the binding position of a staple is bottom right. When the user presses an OK button 2016, the CPU 205 registers, in the RAM 206, the information that describes a binding position and that is stored in the RAM 206 as the binding position of a staple which is used when a stapling process is performed. When a cancel button 2015 is pressed, the CPU 205 does not change the registered information about a binding position on the RAM 206, and changes the screen displayed on the operation unit 210, from the screen 2010 to the screen 2000.

The screen 2020 illustrated in FIG. 2C is a screen for specifying a pressing position (binding position) on sheets which is used when the binding-by-pressure process is performed. Buttons 2021, 2022, 2023, and 2024 are buttons for specifying one of the four corners (top left, top right, bottom left, and bottom right) of a sheet as a binding position. That is, in the present embodiment, a binding position available for the binding-by-pressure process is one of top left, top right, bottom left, and bottom right.

The CPU 205 determines a button which has been pressed by a user, highlights the button, and stores, in the RAM 206, information about a binding position corresponding to the highlighted button. For example, when a user presses the button 2021, the CPU 205 stores, in the RAM 206, information indicating that the binding position for pressure is top left. After that, when the user presses the button 2024, the CPU 205 updates information about a binding position of a staple which is already stored in the RAM 206 with information indicating that the binding position is bottom right. When the user presses an OK button 2026, the CPU 205 registers, in the RAM 206, the information that describes a binding position and that is stored in the RAM 206, as a binding position used when the binding-by-pressure process is performed. When a cancel button 2025 is pressed, the CPU 205 does not update the registered information about a binding position on the RAM 206, and changes the screen displayed on the operation unit 210, from the screen 2020 to the screen 2000.

As described above, the setting screens for binding are described. In the description below, assume that a setting indicating "a binding-by-pressure process is performed in the top left corner of the sheets" has been registered in the RAM 206 as user-specified setting information about binding.

Information for Specifying Binding Operation

Information that describes binding and that is included in a print request (print data) received from an external apparatus (for example, a host computer) via the network IF 211 will be described. In the present embodiment, by using FIGS. 4A to 4D, examples will be described by using PDL data described in PostScript® as print data.

In PostScript, a string "/Staple" is defined as information (stapling operator) about execution of binding. In PostScript, for the stapling operator "/Staple", detailed setting operators for controlling specific functions that depend on an image forming apparatus are present. A string "/StapleDetails" functions as an operator indicating that a description about detailed settings such as a binding position starts from the next. A string "/Position" functions as an operator for specifying a binding position of a staple or for pressure which is used when binding is performed. A string "/EcoStaple" functions as an operator for specifying the type of binding. Each specific string (such as "/Staple") which is described according to a predetermined format functions as information (operator) indicating an instruction to perform an operation. That is, a specific string such as "/Staple" which is merely included in PDL data does not function as an operator. In the description below, a state in which an operator is included means that a specific string corresponding to the operator is described according to a predetermined format. A predetermined format is a description format, according to which information may be understood by the image forming apparatus 100. For example, as in FIG. 4A, a predetermined format is a format in which strings, "<<", "/Staple", a numeric value, "/StapleDetails", "<<", "/Type 21", "/Position (*)", "/EcoStaple", a Boolean value, ">>", and ">>", are described in this sequence. A predetermined format is not limited to the description format in FIG. 4A, and may be a description format illustrated in FIG. 4B or 4C.

A supplementary description on each operator will be made below.

An operator 401 in FIG. 4A is the stapling operator "/Staple". When the stapling operator specifies a numeral value other than "0", the PDL operator indicates an instruction to perform binding. In contrast, when the stapling operator specifies the numeral value "0", the PDL operator explicitly specifies that binding is not to be performed. This is indicated by using an operator 405 in FIG. 4B.

An operator 402 in FIG. 4A is the operator "/StapleDetails" indicating that detailed settings such as a binding position start from the next. The detailed settings are allowed to be optionally defined in accordance with the functions provided for an image forming apparatus.

An operator 403 in FIG. 4A is a detailed setting operator. The operator 403 uses the operator "/Position (TopLeft)" for specifying a binding position, so as to specify that the binding position is top left (TopLeft). A binding position which may be used in the stapling process and the binding-by-pressure process according to the present embodiment is one of top left, top right, bottom left, and bottom right, as described by using FIGS. 2B and 2C. That is, four operators, "/Position (TopLeft)", "/Position (TopRight)", "/Position (BottomLeft)", and "/Position (BottomRight)", may be used in the processing. When an operator of "/Position (*)" other than the four operators (for example, /Position (Upper)) is used, the PDL data is processed as having a syntax error.

An operator 404 in FIG. 4A is a detailed setting operator. The operator 404 is the operator "/EcoStaple" for specifying which type of binding, the stapling process or the binding-by-pressure process (eco-stapling process), is to be performed. When a Boolean value for this operator is "true", the binding-by-pressure process (eco-stapling process) is specified. When a Boolean value for this operator is "false", the stapling process is specified. When a value (including a blank) other than the two Boolean values is specified after "/EcoStaple", the PDL data is processed as having a syntax error.

In short, FIG. 4A illustrates an operator group for specifying the binding-by-pressure process in which the binding position is top left.

In contrast, the operator 405 in FIG. 4B explicitly specifies that binding is not to be performed, by using "/Staple 0". When the operator 405 is received, the image forming apparatus 100 does not perform a binding process itself.

An operator group in FIG. 4C will be described. The operator group in FIG. 4C does not include the operator "/EcoStaple" for specifying the type of binding, and includes the stapling operator "/Staple 3" for specifying execution of binding and the valid detailed setting operator "/Position (TopLeft)" for specifying a binding position. This operator group is described according to a format for which an image forming apparatus which is capable of performing the stapling process, but which is incapable of performing the binding-by-pressure process may understand the description (a format supported by such an image forming apparatus). The operator group is a valid operator group which indicates an instruction that the stapling process is to be performed at the specified binding position. The present embodiment is characterized by how to handle such an operator group, as described below.

An operator group in FIG. 4D will be described. The operator group in FIG. 4D does not include the operator "/Position (*)" for specifying a binding position, but includes the stapling operator "/Staple 3" for indicating an instruction to perform binding and the operator "/EcoStaple" for specifying the type of binding. The operator group is not handled as an error in terms of the PostScript syntax, but is invalid because its description is not made in accordance with a predetermined format supported by the image forming apparatus 100 according to the present embodiment.

The operator in FIG. 4E will be described. The description of the operator in FIG. 4E does not include the valid detailed setting operator "/Position (*)" for specifying a binding position and the operator "/EcoStaple *" for specifying the type of binding, but includes the stapling operator "/Staple 3" for indicating an instruction to perform binding. Similarly to the operators in FIG. 4D, the operator is not handled as an error in terms of the PostScript syntax, but is invalid for the image forming apparatus 100 according to the present embodiment because its description is not made in accordance with the predetermined format.

How to Handle Invalid Operator Group

How to handle operators in the image forming apparatus 100 will be described.

When PDL data includes the operator "/Staple 3" for indicating an instruction to perform binding, the image forming apparatus 100 requires that the PDL data is to include the following three operators: (1) the operator "/StapleDetails"; (2) the valid operator "/Position" for specifying a binding position; and (3) the valid operator "/EcoStaple" for specifying the type of binding. Therefore, the operator group as illustrated in FIG. 4A is valid because its description is made in accordance with the predetermined format.

However, due to an imperfection in a user system or the like, PDL data received by the image forming apparatus 100 may lack an operator for binding although the PDL data is not handled as having a syntax error. In this case, the image forming apparatus 100 according to the present embodiment ignores the operators about binding which are included in the PDL data, and uses information that has been registered in the RAM 206 and that is described by using FIGS. 2A to 2C, whereby the print and binding operations are not stopped and the job is completed. The reason why an error process (stop of execution of the job) due to lack of operators is not performed is that the description itself in the PDL data is valid because the description is made in accordance with the syntax rule of a page description language.

For example, since the operator group in FIG. 4D lacks an operator for specifying a binding position, the operator group is invalid for the image forming apparatus 100. Instead of the operator group, the image forming apparatus 100 uses the setting information for binding which has been registered in the RAM 206. Since the description of the operator in FIG. 4E lacks a detailed setting operator, the operator is invalid for the image forming apparatus 100. The image forming apparatus 100 uses the setting information for binding which has been registered in the RAM 206. That is, in either case, in the present embodiment, the image forming apparatus 100 performs the binding-by-pressure process in the top left corner of sheets according to the setting information registered in accordance with user specifications.

Exception to Handling of Operators

In contrast, the operator group in FIG. 4C includes an operator indicating an instruction to perform binding and a valid operator for specifying a binding position, but lacks an operator for specifying the type of binding. The operator group in FIG. 4C may be handled as described above in <HOW TO HANDLE INVALID OPERATOR GROUP>. However, the image forming apparatus 100 according to the present embodiment takes the following measure.

The image forming apparatus 100 receives PDL data having a valid operator group described in accordance with a predetermined format that includes an operator indicating an instruction to perform binding and a valid operator for specifying a binding position, and that lacks an operator for specifying the type of binding. In this case, "the stapling process is performed at a binding position specified by using the operator." For example, for the operator group in FIG. 4C, the image forming apparatus 100 performs the stapling process in the top left corner of sheets. The reason why such a measure is taken will be described.

For example, a user system inputs PDL data including the operator group in FIG. 4C, to an image forming apparatus that is capable of performing the stapling process but that is incapable of performing the binding-by-pressure process. In this case, the image forming apparatus supports the format of the operator group in FIG. 4C. Therefore, the image forming apparatus performs the stapling process in the top left corner of sheets. In contrast, assume that the user system inputs PDL data including the operator group in FIG. 4C, to an image forming apparatus that is capable of performing both of the stapling process and the binding-by-pressure process. In this case, if the operator group is handled as being invalid, binding is performed in accordance with the information registered in the RAM 206. Therefore, the stapling process is sometimes not performed. That is, even when the user system inputs the same PDL data, the stapling process is sometimes performed and is sometimes not performed depending on image forming apparatuses.

Therefore, a measure is taken in consideration of a case in which a user system which has input PDL data to an image forming apparatus that is capable of performing the stapling process but that is incapable of performing the binding-by-pressure process inputs the PDL data also to the image forming apparatus 100 according to the present embodiment. That is, when PDL data including an operator group that is valid for the former image forming apparatus is input to the image forming apparatus 100 according to the present embodiment, the image forming apparatus 100 according to the present embodiment performs the same operation as that performed by the former image forming apparatus in accordance with the valid operator group. Thus, without changing the description of PDL data depending on an image forming apparatus, a bound article may be obtained by performing the same binding (in this example, the stapling process).

Process Flow of Image Forming Process

Figure 5:
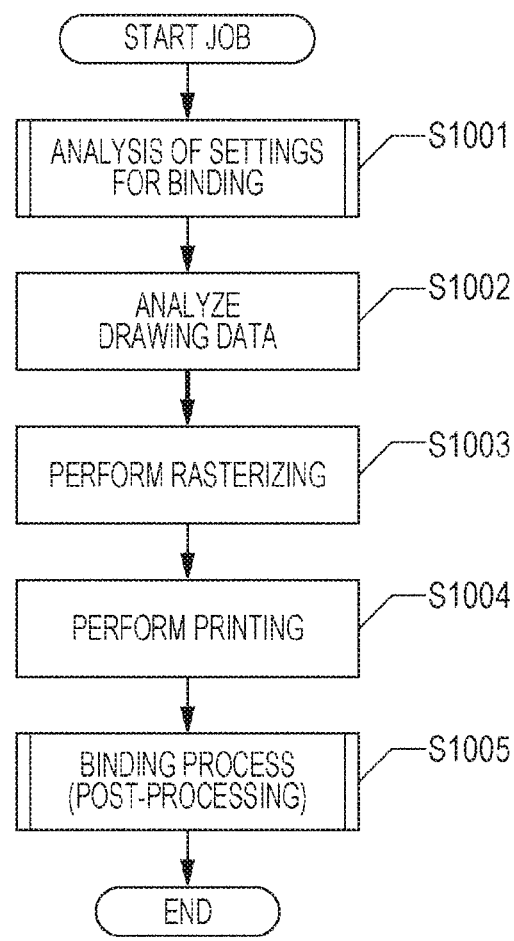
FIG. 5 is a diagram illustrating a print flow, in accordance with an embodiment of the subject disclosure.

FIG. 5 is a flowchart of a process performed by the image forming apparatus 100 according to the present embodiment. The flowchart starts in such a manner that the network IF 211 receiving PDL data from an external apparatus (host PC) as print data and storing the PDL data in the HDD 208 triggers the CPU 205 to execute programs stored in the ROM 207. The CPU 205 has overall control of the units illustrated in FIG. 1, according to the programs.

In S1001, the CPU 205 analyzes settings for binding, in the first page data of the PDL data stored in the HDD 208. That is, in this step, the CPU 205 functions as an analyzing unit for analyzing settings for binding in the PDL data. Specifically, the CPU 205 performs syntax analysis on the PDL data. The target of the analyzing process is not limited to the first page, and all of the pages in the PDL data may be analyzed. The details of the analyzing process will be described by using FIG. 6. The CPU 205 transmits the analysis result for the settings for binding to the print apparatus 202. As described below, according to the analysis result, the print apparatus 202 controls binding. If the analysis result obtained in S1001 indicates that the analyzing unit determines that operators for settings for binding which are included in the PDL data have a syntax error, the process immediately stops, and an error notification is displayed on the operation unit 210 via the operation unit IF 209. In the description below, a description will be continued under the assumption that the PDL data includes a valid operator group having no syntax errors.

In S1002, the CPU 205 obtains drawing data for one page which has not been analyzed, from the PDL data stored in the HDD 208, and analyzes the obtained drawing data. Specifically, the CPU 205 performs syntax analysis on the PDL data. The drawing data indicates drawing commands for characters, figures, images and the like, and the actual data for the drawing commands. The CPU 205 transmits the analysis result for the drawing data to the RIP 216. In this step, the CPU 205 functions as an analyzing unit for transmitting, to the RIP 216, an analysis result obtained by analyzing the drawing data in the PDL data.

In S1003, the RIP 216 performs rasterizing on the basis of the analysis result for the drawing data, thereby generating bitmap image data for one page and storing the generated bitmap image data in the RAM 206. The RIP 216 functions as a rasterizing unit.

In S1004, the print IF 217 converts the bitmap image data stored in the RAM 206 into data (video data) that is capable of being printed by the print apparatus 202, and transmits the video data to the print apparatus 202. The print apparatus 202 prints the image for one page on a sheet on the basis of the video data by using the print mechanism, and conveys the printed sheet for one page to the post-processing mechanism. The conveyed printed matter (printed sheet) is held by the holding rollers of the post-processing mechanism.

Thus, the processes from S1002 to S1004 are performed, whereby a printed sheet for one page is obtained. The processes from S1002 to S1004 are performed for all of the pages in the PDL data, whereby multiple printed sheets are held by the holding rollers of the post-processing mechanism.

In S1005, when the printed sheets for all pages in the PDL data are held in the post-processing mechanism, the print apparatus 202 performs binding on the multiple printed sheets in accordance with the analysis result for settings for binding which has been transmitted from the CPU 205 in S1001. The analysis result for settings for binding includes the following information: 1. whether or not binding is to be performed; 2. a binding position used when binding is performed; and 3. the type of binding in the case where binding is to be performed. According to the information, the print apparatus 202 does not perform binding, performs the stapling process at the specified binding position, or performs the binding-by-pressure process at the specified binding position. Then, the print apparatus 202 discharges the sheets that have been subjected to binding, to the paper output tray.

The flowchart of the process performed by the image forming apparatus 100 according to the present embodiment is described above.

Process of Analyzing Settings for Binding

Figure 6:
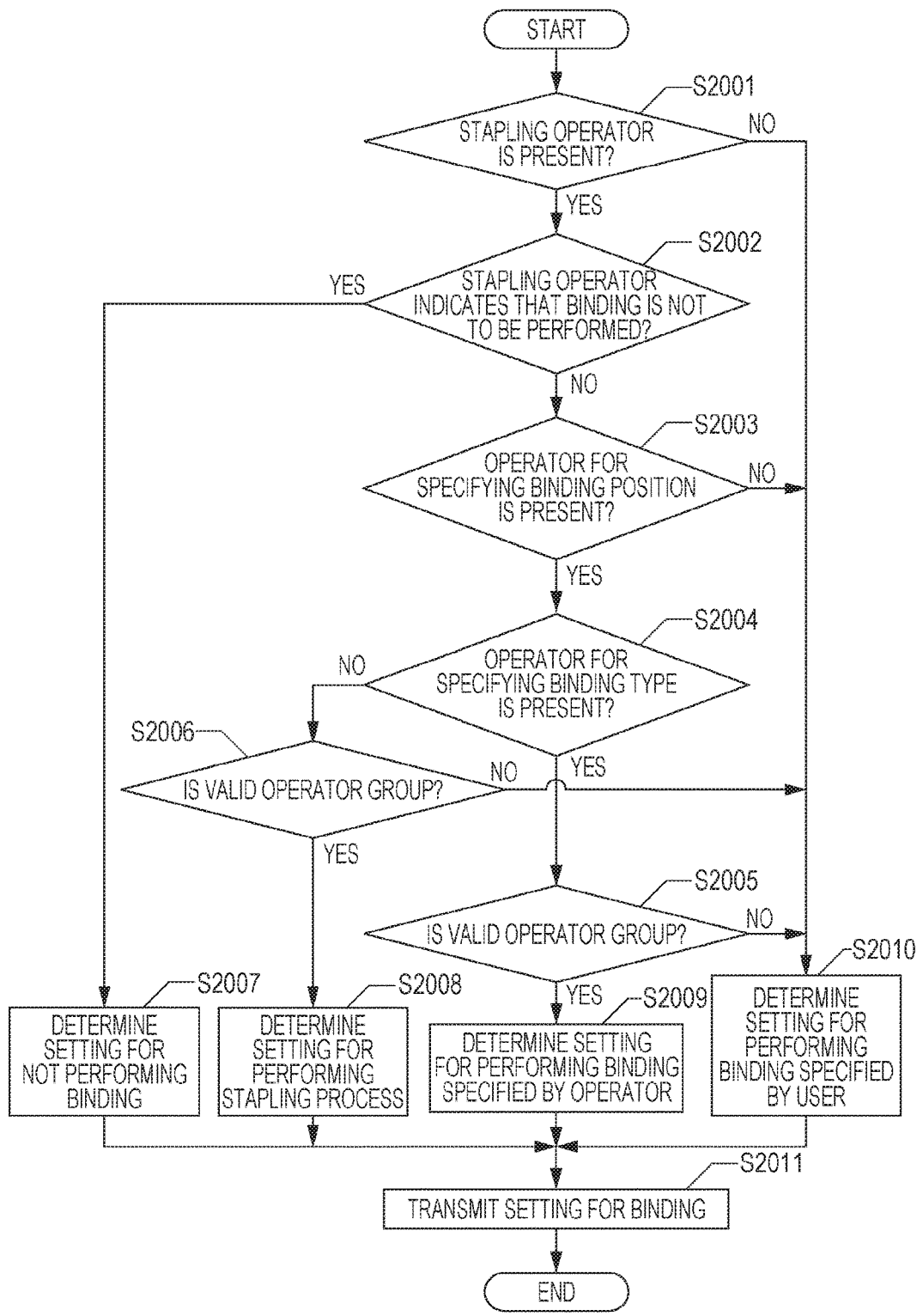
FIG. 6 is a diagram illustrating a process flow for analyzing setting information for binding, in accordance with an embodiment of the subject disclosure.

FIG. 6 illustrates a process flow of an analysis process in which settings for binding are analyzed and which is performed in S1001. In the analysis process, it is determined whether or not the PDL data includes a valid operator group including operators "/Staple 3", "/Position", and "/EcoStaple". In addition to this determination, it is also determined whether or not the operator group included in the PDL data is a valid operator group that does not include "/EcoStaple" and that includes "/Staple 3" and "/Position". In the former determination, it is determined whether or not the operator group in the PDL data is an operator group in a predetermined format supported by the image forming apparatus 100 which is capable of performing both of the stapling process and the binding-by-pressure process. In the latter determination, it is determined whether or not the operator group in the PDL data is an operator group that is to be input to an image forming apparatus which is capable of performing only the stapling process, in order to perform the stapling process.

In S2001, the CPU 205 functioning as an analyzing unit determines whether or not the PDL data includes information (stapling operator) about execution of binding. If the PDL data includes the stapling operator, the process proceeds to S2002. Otherwise, the process proceeds to S2010.

In S2002, the analyzing unit determines whether or not the stapling operator indicates an instruction not to perform binding. In the present embodiment, if the PDL data includes the stapling operator "/Staple 0", the analyzing unit causes the process to proceed to S2007, and stores information indicating that binding is not to be performed, as an analysis result for settings for binding in the RAM 206. Otherwise, the analyzing unit causes the process to proceed to S2003, and determines whether or not the PDL data includes an operator for specifying a binding position. In the present embodiment, it is determined whether or not the PDL data includes either one of the four predetermined valid operators (/Position (TopLeft), /Position (TopRight), /Position (BottomLeft), and /Position (BottomRight)) allowable for the image forming apparatus 100.

If the PDL data includes an operator for specifying a binding position, the analyzing unit determines whether or not the PDL data includes a valid operator for specifying the type of binding, in S2004. If the PDL data includes an operator for determining the type of binding, the process proceeds to S2005. Otherwise, the process proceeds to S2006.

In S2005, the analyzing unit determines whether or not the operator group included in the PDL data is a valid operator group described in a predetermined format (first predetermined format) supported by the image forming apparatus 100. For example, as illustrated in FIG. 4A, the valid operator group is an operator group described in a format which is used to provide an instruction to perform binding of the type specified with an operator, and which is used in the image forming apparatus 100 according to the present embodiment which is capable of performing both of the stapling process and the binding-by-pressure process. If it is determined that the PDL data includes an operator group described in the predetermined valid format, the process proceeds to S2009. Otherwise, the process proceeds to S2010.

In S2006, the analyzing unit determines whether or not the operator group included in the PDL data is a valid operator group described in a predetermined format (second predetermined format) supported by the image forming apparatus 100. For example, as illustrated in FIG. 4C, the valid operator group is an operator group described in a format which is used to provide an instruction to perform the stapling process and which is used in an image forming apparatus that is capable of performing only the stapling process. The valid operator group described in the predetermined format is an operator group which is obtained in such a manner that an operator indicating the type of binding lacks from the valid operator group described in the predetermined format in S2005 and which is described in a format in which fewer operators are present. If it is determined that the PDL data includes a valid operator group described in the predetermined format, the process proceeds to S2008. Otherwise, the process proceeds to S2010. By causing the process to proceed to S2008, compatibility of the image forming apparatus 100 is improved. That is, if the description format of the operator group is different from the predetermined format used in the determination in S2005, the process in S2010 is basically performed. If the determination result in S2006 indicates that the description format of the operator group is a specific format, the process in S2008 is exceptionally performed.

In S2008, the analyzing unit stores information indicating that the stapling process is to be performed at the binding position specified by the operator "/Position", as an analysis result for settings for binding in the RAM 206.

In S2009, the analyzing unit stores information indicating that binding of the type specified by the "/EcoStaple" operator is to be performed at the binding position specified by the operator "/Position", as an analysis result for settings for binding in the RAM 206.

In S2010, the analyzing unit refers to the user-specified setting information that has been already registered in the RAM 206, and stores information indicating that binding corresponding to the setting information is to be performed, as an analysis result for settings for binding in the RAM 206. In the present embodiment, according to the user-specified setting information registered in the RAM 206, information indicating that "the binding-by-pressure process is to be performed in the top left corner of sheets" is stored as an analysis result for settings for binding in the RAM 206.

In S2011, the analyzing unit transmits the analysis result for settings for binding which is stored in the RAM 206 in any of steps S2007 to S2010, via the print IF 217 to the print apparatus 202.

The process flow for the analysis process in S1001 is described above.

As described above, the image forming apparatus 100 according to the present embodiment may perform binding of the specified type at the specified binding position according to PDL data (print data) including an operator group described in a predetermined normal format. Further, if the operator group is described in a valid format for an image forming apparatus that is capable of performing only the stapling process, the image forming apparatus 100 may perform the stapling process at the specified binding position. Thus, the image forming apparatus 100 according to the present embodiment has enhanced compatibility with an operator group for an image forming apparatus that is capable of performing only the stapling process.

The analysis process of analyzing settings for binding in PDL data according to the present embodiment may be performed on an information processing apparatus (host computer) that is different from the image forming apparatus 100, and the analysis result for settings for binding may be notified to the image forming apparatus. In this case, the image forming apparatus uses the post-processing mechanism to perform binding in accordance with the notified analysis result for settings for binding.

The post-processing mechanism of the image forming apparatus 100 according to the present embodiment may be a different apparatus removable from the image forming apparatus 100 itself. For example, as long as the separate post-processing mechanism performs binding on printed matter obtained through printing in the print mechanism of the image forming apparatus 100, on the basis of the analysis result for settings for binding which is received from the image forming apparatus 100, any configuration may be employed.

That is, the scope of the present disclosure encompasses a system in which each of an analysis process on PDL data, a printing process based on PDL data, and a binding process on printed matter obtained through the printing is performed in a corresponding one of different apparatuses.

Second Embodiment

In the first embodiment, the case in which a stapling operator is only "/Staple" is described. In the present embodiment, a case in which a stapling operator for the stapling process is "/Staple", and in which a stapling operator for the binding-by-pressure process is "/EcoStaple" will be described. The image forming apparatus 100 according to the present embodiment has a configuration similar to that of the image forming apparatus 100 according to the first embodiment, and repeated description will be avoided. That is, the analysis process in S1001 will be described.

FIG. 4F illustrates a "/EcoStaple" operator 406 which is a stapling operator for the binding-by-pressure process. The operator group indicates an instruction to perform the binding-by-pressure process in the top left corner of sheets. When the stapling operator for the binding-by-pressure process is used to explicitly indicate that binding is not to be performed, "/EcoStaple 0" is used.

Figure 7:
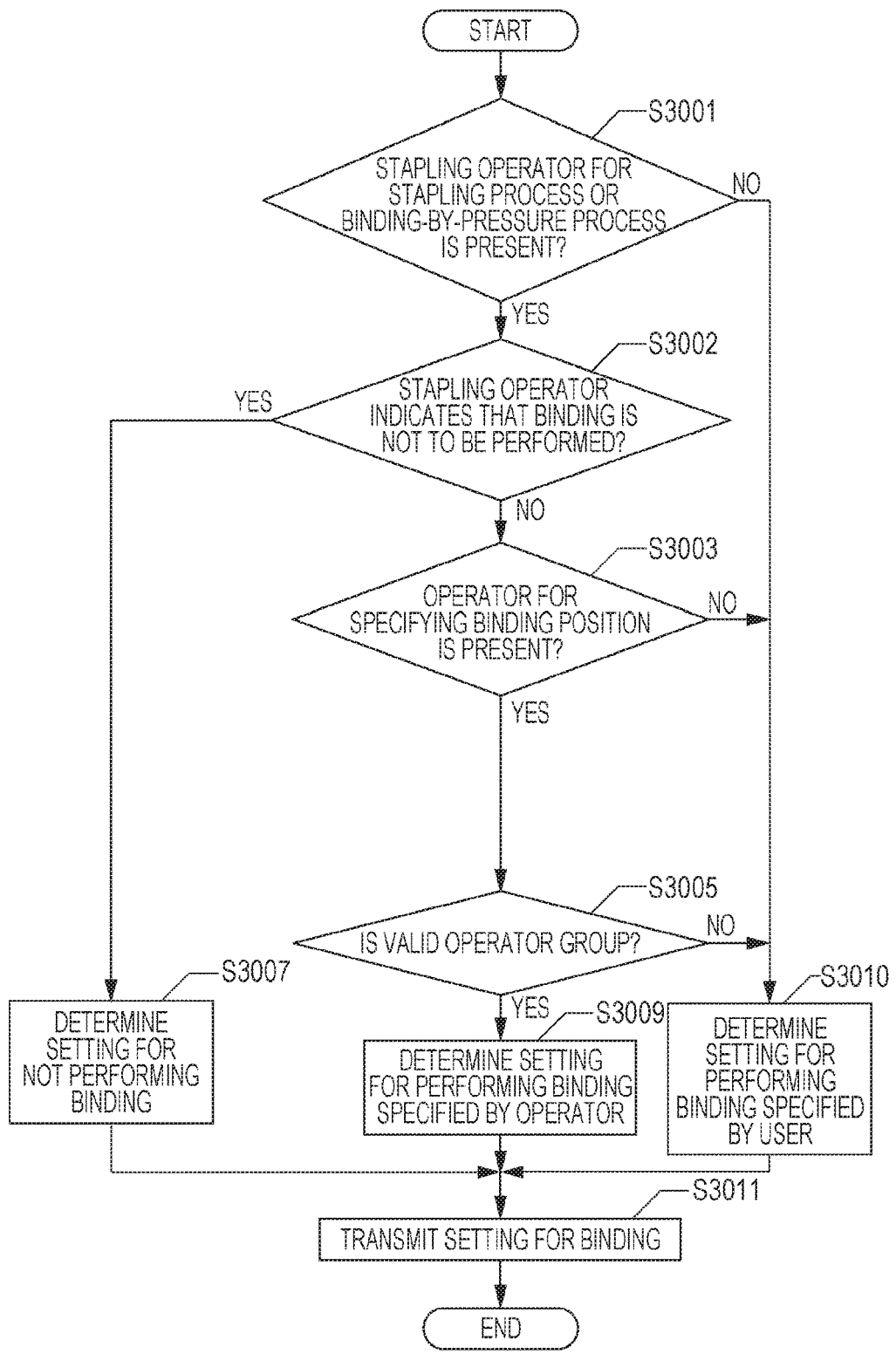
FIG. 7 is a diagram illustrating a process flow for analyzing setting information for binding, in accordance with an embodiment of the subject disclosure.

FIG. 7 illustrates a flowchart of the analysis process performed in S1001 by the image forming apparatus 100 which supports not only the stapling operator for the stapling process but also the stapling operator for the binding-by-pressure process.

In S3001, the CPU 205 functioning as an analyzing unit determines whether or not the PDL data includes a stapling operator for specifying the stapling process or a stapling operator for specifying the binding-by-pressure process. If the PDL data includes one of these stapling operators, the process proceeds to S3002. Otherwise, the process proceeds to S3010.

In S3002, the analyzing unit determines whether or not the stapling operator indicates an instruction not to perform binding. In the present embodiment, if the PDL data includes a stapling operator of "/Staple 0" or "/EcoStaple 0", the analyzing unit causes the process to proceed to S3007. The analyzing unit stores information indicating that binding is not to be performed, as an analysis result for settings for binding in the RAM 206. Otherwise, the analyzing unit causes the process to proceed to S3003, and determines whether or not the PDL data includes an operator for specifying a binding position. In the present embodiment, it is determined whether or not the PDL data includes either of the four predetermined valid operators (/Position (TopLeft), /Position (TopRight), /Position (BottomLeft), and /Position (BottomRight)) allowable for the image forming apparatus 100.

If the PDL data includes an operator for specifying a binding position, the analyzing unit determines whether or not the operator group included in the PDL data is a valid operator group described in a predetermined format supported by the image forming apparatus 100, in S3005. A valid operator group is, for example, an operator group described in a format illustrated in FIG. 4A, 4C, or 4F. If it is determined that the PDL data includes an operator group described in a valid predetermined format, the process proceeds to S3009. Otherwise, the process proceeds to S3010.

In S3009, the analyzing unit stores information indicating that binding of the type specified by the stapling operator (/Staple or /EcoStaple) is to be performed at the binding position specified by the operator "/Position", as an analysis result for settings for binding in the RAM 206.

In S3010, the analyzing unit refers to the user-specified setting information which has been already registered in the RAM 206, and stores information indicating that binding corresponding to the setting information is to be performed, as an analysis result for settings for binding in the RAM 206. In the present embodiment, according to the user-specified setting information registered in the RAM 206, information indicating that "the binding-by-pressure process is to be performed in the top left corner of sheets" is stored as an analysis result for settings for binding in the RAM 206.

In S3011, the analyzing unit transmits the analysis result for settings for binding which is stored in the RAM 206 in any of steps S3007, S3009, and S3010, via the print IF 217 to the print apparatus 202.

The process flow of the analysis process in S1001 according to the present embodiment is described above.

OTHER EMBODIMENTS

The present disclosure may be achieved in such a manner that programs for achieving one or more functions according to the above-described embodiments are supplied to a system or apparatus via a network or a storage medium, and that one or more processors in a computer in the system or apparatus read and execute the programs. Alternatively, a circuit (for example, an ASIC) for achieving one or more functions may be used to achieve the present disclosure.

According to the present disclosure, both of print data in a format including the type of binding and print data in a format excluding the type of binding may be adequately handled.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of International Patent Application No. PCT/JP2015/074145, filed Aug. 27, 2015, which is hereby incorporated by reference herein in its entirety.

The invention claimed is:

1. A method for controlling a binding process, comprising:
   receiving print data including a binding command;
   determining whether the binding command is in a first predetermined format where a bind type is to be specified or in a second predetermined format where a bind type is not to be specified wherein the binding type is specified by either staple binding or staple-less binding;
   based on the binding command determined to be in the first predetermined format, binding, by one of binding methods which corresponds to the specified bind type, printed sheets which are based on the received print data; and
   based on the binding command determined to be in the second predetermined format without a bind type, binding, by a staple binding, printed sheets based on the received print data
   wherein the staple binding is to be performed regardless of a number of printed sheets on the basis of reception of the second print data in the second predetermined format and wherein the binding command in the second predetermined format causes staple binding in a finisher of a printer which does not support staple-less binding.

2. The method according to claim 1,
   wherein the binding methods includes the predetermined binding method.

3. The method according to claim 2,
   wherein one of the binding methods being the predetermined binding method corresponds to a first bind type, and another one of the binding methods corresponds to a second bind type, and
   wherein the predetermined binding method uses a staple for binding, and the another binding method does not use a staple for binding.

4. The method according to claim 3,
   wherein the another binding method crimps printed sheets in order to bind the printed sheets.

5. The method according to claim 1,
   wherein the second predetermined format is used for instructing an apparatus which supports the first predetermined format and is also used for instructing another apparatus which does not support the first predetermined format.

6. An apparatus for controlling a binding process, comprising:
   a controller including a memory storing instructions and at least one processor which executes the instructions, the controller being configured to:
      receive print data including a binding command;
      determine whether the binding command is in a first predetermined format where a bind type is needed to be specified or in a second predetermined format where a bind type is not needed to be specified;
      based on the binding command determined to be in the first predetermined format and the specified bind type being a first bind type, control a first binder to bind printed sheets which are based on the received print data;
      based on the binding command determined to be in the first predetermined format and the specified bind type being a second bind type, control a second binder to bind printed sheets which are based on the received print data; and
      based on the binding command determined to be in the second predetermined format without a bind type, control the first binder to bind printed sheets which are based on the received print data.

7. The apparatus according to claim 6,
   wherein the first binder is a binder for binding the printed sheets using a staple and the second binder is a binder for binding the printed sheets without using a staple.

8. The apparatus according to claim 7,
   wherein the second binder is configured to bind the printed sheets by crimping.

9. The apparatus according to claim 7,
wherein the second predetermined format is used for, as well as the apparatus, another apparatus which does not support the first predetermined format, the other apparatus being configured to control a binder to bind printed sheets based on a binding command in the second predetermined format.

10. An image forming apparatus comprising:
a first binding unit for performing a first binding process;
a second binding unit for performing a second binding process;
a receiving unit that is capable of receiving both first print data in a first predetermined format and second print data in a second predetermined format, the first print data indicating an instruction to perform binding and including information for specifying the type of the binding, the second print data indicating an instruction to perform binding and excluding the information for specifying the type of the binding wherein the type of the binding is specified by either staple binding or staple-less binding; and
a controlling unit for controlling the first binding unit or the second binding unit on the basis of reception of the first print data in the first predetermined format, the reception of the first print data being performed by the receiving unit, and controlling the first binding unit on the basis of reception of the second print data in the second predetermined format, the reception of the second print data being performed by the receiving unit, the controlling based on the reception of the first print data being performed in such a manner that binding of the type specified by the information for specifying the type of binding is performed on printed matter obtained on the basis of the first print data, the information being included in the first print data, the controlling based on the reception of the second print data being performed in such a manner that the first binding process is performed on printed matter obtained on the basis of the second print data
wherein the staple binding is to be performed regardless of a number of printed sheets on the basis of reception of the second print data in the second predetermined format and wherein the binding command second print data in the second predetermined format causes staple binding in a finisher of a printer which does not support staple-less binding.

11. The image forming apparatus according to claim 10,
wherein the receiving unit is further capable of receiving third print data that is not described in the first predetermined format and the second predetermined format and that does not have a syntax error, and
wherein the controlling unit further controls the first binding unit or the second binding unit on the basis of reception of the third print data that is not described in the first predetermined format and the second predetermined format and that does not have a syntax error, the reception of the third print data being performed by the receiving unit, the controlling based on the reception of the third print data being performed in such a manner that binding of a type specified by a user is performed on printed matter obtained on the basis of the third print data.

12. The image forming apparatus according to claim 10,
wherein, in the first predetermined format, first information indicating an instruction to perform binding and second information for specifying the type of binding are used, and
wherein, in the second predetermined format, the first information indicating an instruction to perform binding is used, but the second information for specifying the type of binding is not used.

13. The image forming apparatus according to claim 10,
wherein the first print data in the first predetermined format includes information for specifying a binding position and information for specifying the type of binding,
wherein the second print data in the second predetermined format includes information for specifying a binding position but does not include information for specifying the type of binding, and
wherein the controlling unit controls the first binding unit or the second binding unit on the basis of reception of the first print data, and controls the first binding unit on the basis of reception of the second print data, the controlling based on the reception of the first print data being performed in such a manner that binding of the type specified in the included information for specifying the type of binding is performed at a binding position specified in the included information for specifying a binding position, the controlling based on the reception of the second print data being performed in such a manner that the first binding process is performed at the binding position specified in the included information for specifying a binding position.

14. The image forming apparatus according to claim 10,
wherein the receiving unit is further capable of receiving fourth print data that does not indicate an instruction to perform binding, and
wherein the first binding unit or the second binding unit is controlled on the basis of reception of the fourth print data that does not indicate an instruction to perform binding, in such a manner that binding of a type specified by a user is performed on printed matter obtained on the basis of the fourth print data, the reception of the fourth print data being performed by the receiving unit.

15. The image forming apparatus according to claim 10,
wherein a predetermined format excluding the information for specifying the type of binding is a format supported by an image forming apparatus including a binding unit that is capable of performing the first binding process but that is incapable of performing the second binding process.

16. The image forming apparatus according to claim 10,
wherein the first binding process is a process of binding a plurality of sheets by using a staple, and
wherein the second binding process is a process of binding a plurality of sheets by processing the sheets.

17. An image forming system comprising:
a first binding unit for performing a first binding process;
a second binding unit for performing a second binding process;
a receiving unit that is capable of receiving both of first print data in a first predetermined format and second print data in a second predetermined format, the first print data indicating an instruction to perform binding and including information for specifying the type of the binding, the second print data indicating an instruction to perform binding and excluding the information for specifying the type of the binding; and
a controlling unit for controlling the first binding unit or the second binding unit on the basis of reception of the first print data in the first predetermined format, the reception of the first print data being performed by the receiving unit wherein the type of the binding is specified by either staple binding or staple-less binding, and controlling the first binding unit on the basis of reception of the second print data in the second predetermined format, the reception of the second print data being performed by the receiving unit, the controlling based on the reception of the first print data being performed in such a manner that binding of the type specified by the information for specifying the type of binding is performed on printed matter obtained on the basis of the first print data, the information being included in the first print data, the controlling based on the reception of the second print data being performed in such a manner that the first binding process is performed on printed matter obtained on the basis of the second print data wherein the staple binding is to be performed regardless of a number of printed sheets on the basis of reception of the second print data in the second predetermined format and wherein the binding command second print data in the second predetermined format causes staple binding in a finisher of a printer which does not support staple-less binding.

18. The image forming system according to claim 17, wherein the receiving unit is further capable of receiving third print data that is not described in the first predetermined format and the second predetermined format and that does not have a syntax error, and
wherein the controlling unit further controls the first binding unit or the second binding unit on the basis of reception of the third print data that is not described in the first predetermined format and the second predetermined format and that does not have a syntax error, the reception of the third print data being performed by the receiving unit, the controlling based on the reception of the third print data being performed in such a manner that binding of a type specified by a user is performed on printed matter obtained on the basis of the third print data.

19. The image forming system according to claim 17, wherein, in the first predetermined format, first information indicating an instruction to perform binding and second information for specifying the type of binding are used, and
wherein, in the second predetermined format, the first information indicating an instruction to perform binding is used, but the second information for specifying the type of binding is not used.

20. The image forming system according to claim 17, wherein the first print data in the first predetermined format includes information for specifying a binding position and information for specifying the type of binding,
wherein the second print data in the second predetermined format includes information for specifying a binding position but does not include information for specifying the type of binding, and
wherein the controlling unit controls the first binding unit or the second binding unit on the basis of reception of the first print data, and controls the first binding unit on the basis of reception of the second print data, the controlling based on the reception of the first print data being performed in such a manner that binding of the type specified in the included information for specifying the type of binding is performed at a binding position specified in the included information for specifying a binding position, the controlling based on the reception of the second print data being performed in such a manner that the first binding process is performed at the binding position specified in the included information for specifying a binding position.

21. The image forming system according to claim 17, wherein the receiving unit is further capable of receiving fourth print data that does not indicate an instruction to perform binding, and
wherein the first binding unit or the second binding unit is controlled on the basis of reception of the fourth print data that does not indicate an instruction to perform binding, in such a manner that binding of a type specified by a user is performed on printed matter obtained on the basis of the fourth print data, the reception of the fourth print data being performed by the receiving unit.

22. The image forming system according to claim 17, wherein a predetermined format excluding the information for specifying the type of binding is a format supported by an image forming apparatus including a binding unit that is capable of performing the first binding process but that is incapable of performing the second binding process.

23. The image forming system according to claim 17, wherein the first binding process is a process of binding a plurality of sheets by using a staple, and
wherein the second binding process is a process of binding a plurality of sheets by processing the sheets.

* * * * *